(12) United States Patent
Schuster et al.

(10) Patent No.: US 7,137,597 B2
(45) Date of Patent: Nov. 21, 2006

(54) IN-FLIGHT REFUELING SYSTEM, BLADDER DEVICE AND METHOD FOR PREVENTING OSCILLATIONS IN IN-FLIGHT REFUELING SYSTEM COMPONENTS

(75) Inventors: John H. Schuster, Derby, KS (US); Mark H. Wexler, Derby, KS (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 10/925,341

(22) Filed: Aug. 24, 2004

(65) Prior Publication Data

US 2006/0043241 A1  Mar. 2, 2006

(51) Int. Cl.
*B64D 39/00* (2006.01)

(52) U.S. Cl. ............................. 244/135 A; 244/135 B; 244/1 TD

(58) Field of Classification Search .............. 43/135 A, 43/135 B, 135 C, 135 R, 136, 1 TD; 239/171; 137/355.25, 615; 188/378; 141/387, 392; 138/118, 118.1, 115, 119, 121, 125, 128
See application file for complete search history.

(56) References Cited

U.S. PATENT DOCUMENTS

| | | | | |
|---|---|---|---|---|
| 2,124,867 A | * | 7/1938 | Akerman ................. | 244/135 A |
| 2,670,913 A | * | 3/1954 | Castor et al. ........... | 244/135 R |
| 3,251,565 A | * | 5/1966 | Haist ....................... | 244/1 TD |
| 3,976,100 A | * | 8/1976 | Souslin .................. | 137/614.03 |
| 4,095,761 A | * | 6/1978 | Anderson et al. ........ | 244/135 A |
| 4,231,536 A | * | 11/1980 | Ishimitsu et al. ....... | 244/135 A |
| 5,427,333 A | * | 6/1995 | Kirkland ................. | 244/135 A |
| 5,626,313 A | * | 5/1997 | Davis ..................... | 244/135 B |
| 5,667,170 A | * | 9/1997 | Moss et al. ............. | 244/135 A |
| 6,375,123 B1 | * | 4/2002 | Greenhalgh et al. .... | 244/135 A |
| 6,604,711 B1 | * | 8/2003 | Stevens et al. ......... | 244/135 A |
| 6,824,105 B1 | * | 11/2004 | Edwards ................. | 244/135 A |
| 7,007,894 B1 | * | 3/2006 | Takacs et al. ........... | 244/135 A |
| 2005/0045768 A1 | * | 3/2005 | Saggio et al. ........... | 244/135 A |
| 2006/0065785 A1 | * | 3/2006 | Enig et al. .............. | 244/135 A |

* cited by examiner

*Primary Examiner*—Peter M. Poon
*Assistant Examiner*—Jia Qi Zhou
(74) *Attorney, Agent, or Firm*—Alston & Bird LLP

(57) ABSTRACT

An in-flight refueling system, bladder device and method are provided for enhancing the stability of an elongate hose extending from a tanker aircraft during an in-flight refueling operation. The various embodiments of the present invention provide a compact, lightweight, and low-profile bladder device that may fill with fuel from a fuel conduit defined in the elongate hose so as to minimize the occurrence of oscillations within the elongate hose by selectively adding additional weight to a portion of the elongate hose. Thus, embodiments of the present invention may minimize the occurrence of oscillations in the elongate hose by stabilizing the elongate hose as it extends from the tanker aircraft during an in-flight refueling operation.

18 Claims, 3 Drawing Sheets

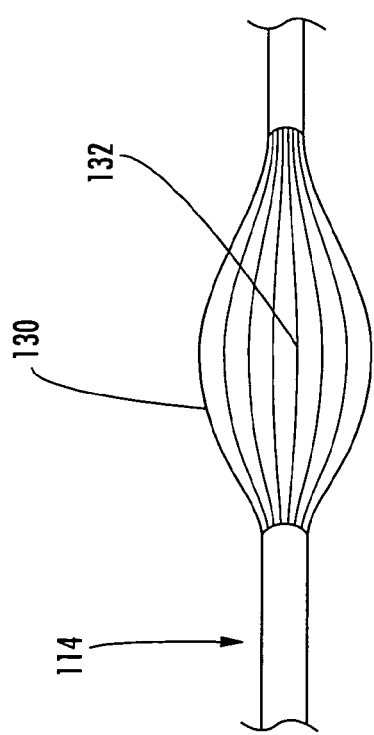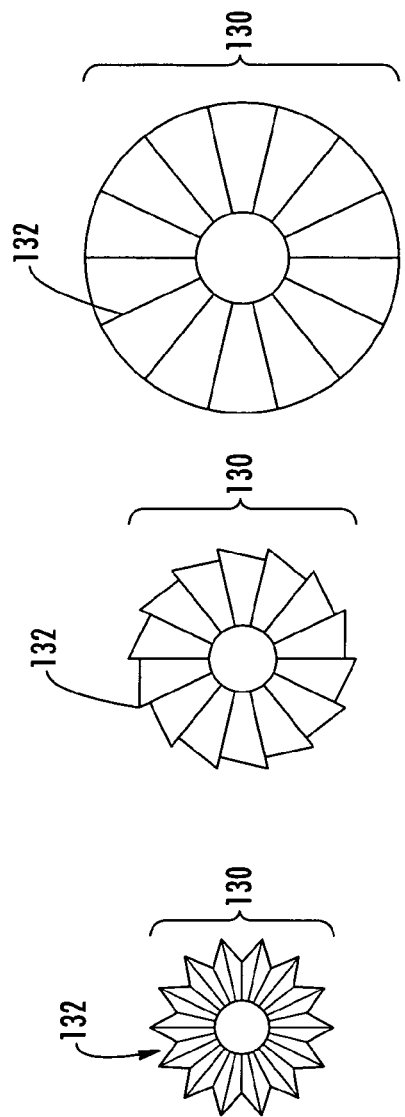

IN-FLIGHT REFUELING SYSTEM, BLADDER DEVICE AND METHOD FOR PREVENTING OSCILLATIONS IN IN-FLIGHT REFUELING SYSTEM COMPONENTS

FIELD OF THE INVENTION

The present invention relates generally to in-flight refueling of a manned or unmanned aircraft using a probe and drogue in-flight refueling system, and specifically, providing a bladder device having the capability of filling with fluid so as to add weight to a portion of an elongate hose trailing from a tanker aircraft as part of an in-flight refueling operation so as to reduce or prevent oscillatory motion or other changes in disposition of the elongate hose. More particularly the present invention relates to the shape and placement of the bladder device near the drogue end of the elongate hose so as to stabilize the elongate hose as it is extended from a tanker aircraft as part of an in-flight refueling operation.

BACKGROUND OF THE INVENTION

In-flight refueling (or air-to-air refueling) is an important method for extending the range of both manned and unmanned aircraft traveling long distances over areas having no feasible landing or refueling points. Although in-flight refueling is a relatively common operation, especially for military aircraft, the passage of large amounts of fuel between a first aircraft (the tanker aircraft, for instance) and a second aircraft (the receiver aircraft, for instance) during an in-flight refueling operation may create a potentially dangerous situation, especially if components of the in-flight refueling system are allowed to move or oscillate in an uncontrolled manner. In addition, the close proximity of the first aircraft and the second aircraft during an in-flight refueling operation may create the danger of a mid-air collision between the aircraft. Such a danger may be increased if a component of an in-flight refueling system extending from the first aircraft is allowed to oscillate or move in an erratic manner relative to the first aircraft.

One conventional system for in-flight refueling is the probe and drogue in-flight refueling system wherein the first aircraft may extend an elongate flexible hose having an end attached to a drogue such that the second aircraft, having a refueling probe extending therefrom, may engage the drogue while in flight in order to initiate the transfer of fuel. An operator of the second aircraft is responsible for maneuvering the second aircraft such that the refueling probe extending therefrom may enter and engage the drogue. According to some conventional probe and drogue in-flight refueling systems, the engagement of the refueling probe with the drogue is accomplished as the second aircraft carefully accelerates with respect to the trailing drogue. The drogue may include, for instance, a catch mechanism for securing the refueling probe within the drogue so that the refueling probe may be securely fastened within the drogue during the transfer of fuel. The catch mechanism may also include a fuel valve that may be opened when the probe is secured within the drogue. Thus, fuel may be pumped from the first aircraft into the elongate hose and down to the fuel valve disposed in the drogue so as to pressurize the elongate hose prior to the engagement of the probe carried by the second aircraft.

The elongate hose extending from the first aircraft may trail directly aft and below a fuselage of the first aircraft, or, in some instances, it may trail directly aft and below a refueling pod that may be carried by the first aircraft on, for instance, a wing hardpoint. In both of these cases, the elongate hose may be exposed to high wind speeds as it is trailed behind the first aircraft. For instance, the first aircraft may travel at speeds between about 180 and 400 knots during a conventional in-flight refueling operation. During an in-flight refueling operation using a probe and drogue in-flight refueling system, the elongate hose may trail aft and below the first aircraft in a stable arc such that the drogue operably engaged with the end of the elongate hose may be held in a relatively stable position relative to the first aircraft. In such cases, an operator of the second aircraft may position the second aircraft such that a refueling probe extending therefrom may engage the relatively stable drogue.

As in all mechanical systems, however, the elongate hose and attached drogue may experience oscillatory vibrations in response to applied forces (such as for instance, wind forces). In some cases, the elongate hose (and attached drogue) may begin to oscillate uncontrollably (at for instance, a resonance frequency) with respect to the first aircraft such that the drogue may move in an erratic pattern with respect to the first aircraft such that it may become difficult for an operator of the second aircraft to maneuver the second aircraft such that the refueling probe extending therefrom may be engaged with the drogue. In such cases, the elongate hose, may, for instance, rise into an upward arc relative to the first aircraft and/or oscillate relative to the first aircraft. Such motion may not only make the in-flight refueling operation difficult but also endanger both the first and second aircraft if the motion becomes extreme. The safety of the crews that may operate the first and second aircraft may be in danger if the elongate hose and attached drogue begin to impact the control surfaces or other structural components of the first or second aircraft.

In such cases, conventional probe and drogue in-flight refueling systems may provide an elongate hose "take-up" system disposed, for instance, in the fuselage of the first aircraft, for stabilizing the hose with respect to the first aircraft. More particularly, the "take up" system may act to take up excess slack in the elongate hose in order to shorten the extension of the elongate hose in an attempt to dampen the oscillation of the elongate hose. If such a "take-up" system is used, however, the elongate hose may be drawn away from the second aircraft such that the in-flight refueling operation must be restarted wherein the first aircraft must re-extend the elongate hose and the second aircraft must re-position itself relative to the elongate hose and drogue attached to an end thereof. Additionally, simply taking up slack in the hose may not ensure that the oscillations in the elongate hose will not reappear when the elongate hose is re-extended. Additionally, suspending the in-flight refueling operation in order to retract and re-extend the elongate hose may be disadvantageous especially in cases wherein the second aircraft is carrying only a minimal amount of fuel and is therefore in need of an expeditious in-flight refueling contact.

Conventional probe and drogue in-flight refueling systems may also provide a guillotine system for cutting and jettisoning the elongate hose should oscillations or movement of the elongate hose and attached drogue become erratic enough so as to endanger the operators and/or other crew of either the first or second aircraft. However, it is undesirable to jettison the elongate hose and attached drogue as the first aircraft must cease in-flight refueling operations and return to an airfield for costly and complex repairs to the in-flight refueling system.

Therefore, there exists a need for an in-flight refueling system and method for damping oscillations and preventing changes in disposition that may occur in probe and drogue in-flight refueling system components, such as for instance, an elongate hose trailing aft and below a first aircraft (serving as, for instance, a tanker aircraft). More particularly, there exists a need for a passive, low-profile, and compact device that may add weight or increase the inertia at the drogue to enhance the stability of a portion of the elongate hose as it is trailed below and aft of the tanker aircraft as part of an in-flight refueling operation.

Thus, it would be advantageous to provide an alternative in-flight refueling system and method for damping oscillations or changes in the disposition of the elongate hose and attached drogue that may occur during an in-flight refueling operation. Also, it would be advantageous to provide a device for damping oscillation of the elongate hose and attached drogue that is passive, simple, lightweight, and compact enough to be stored within existing in-flight refueling system pods or within a fuselage of the first aircraft without the need to modify existing in-flight refueling system components.

SUMMARY OF THE INVENTION

The embodiments of the present invention satisfy the needs listed above and provide other advantages as described below. The in-flight refueling system, according to one embodiment, includes a tanker aircraft, an elongate hose having a first end carried by the tanker aircraft and an opposing second end configured to extend from the tanker aircraft, and a bladder device engaged with the elongate hose and configured to be in fluid communication with the elongate hose so as to be capable of being filled by a flow of fluid, such as the fuel carried by the elongate hose. Thus, the filled bladder device may be configured to substantially increase the weight of a portion of the elongate hose so as to resist a change in disposition of the elongate hose that may occur in response to an aerodynamic force exerted on the elongate hose as it is extended from the tanker aircraft. Furthermore, according to other embodiments of the in-flight refueling system, the bladder device may be operably engaged with the second end of the elongate hose and may be configured to substantially surround the elongate hose.

According to other embodiments, the bladder device of the present invention may define a plurality of longitudinal pleats such that the bladder device may be capable of folding along the plurality of longitudinal pleats around an outer surface of the elongate hose such that the bladder device may conform to the outer surface of the elongate hose when empty. Furthermore, the bladder device may further comprise an inner liner configured to contain the flow of fuel and an outer sheath capable of containing the inner liner. In addition, the outer sheath may be composed of a substantially non-elastic material such that the filled bladder device may be constrained to a pre-determined shape. Also, according to some embodiments, the in-flight refueling system of the present invention may further comprise a valve device configured to be capable of selectively closing the second end of the elongate hose so that the bladder device may be filled with fuel.

The embodiments of the present invention also provide a method for facilitating the stabilization of an elongate hose having a first end carried by a tanker aircraft and an opposing second end configured to extend from the tanker aircraft. For instance, according to some embodiments, the method comprises the step of filling a bladder device operably engaged with a portion of the elongate hose with fluid, such as the fuel carried by the elongate hose, such that the weight of the portion of the elongate hose is increased. This step may thus cause resistance to any change in disposition of the elongate hose that may occur in response to an aerodynamic or wind force exerted on the elongate hose as it is trailed aft and below a tanker aircraft. According to other method embodiments, the method may further comprise the steps of closing the second end of the elongate hose such that the bladder device may fill with fuel; opening the second end of the elongate hose after the bladder device has filled with fuel so as to allow fuel to pass through the elongate hose; retracting the elongate hose relative to the tanker aircraft; and compressing the elongate hose as the elongate hose is retracted such that fuel is expelled from the bladder device as the elongate hose is retracted.

Thus the various embodiments of the in-flight refueling system, bladder device, and method of the present invention provide many advantages that may include, but are not limited to: providing an in-flight refueling system that may resist changes in disposition of an end of the elongate hose trailing from a tanker aircraft during an in-flight refueling operation, providing a bladder device that is capable of filling with a fluid so as to add weight and thereby passively prevent oscillations that may occur in the elongate hose due to wind or other aerodynamic forces exerted on the elongate hose and a drogue attached thereto, and providing a bladder device that may be folded about the elongate hose when substantially empty such that the bladder device is capable of being stored in existing in-flight refueling system pods or in a fuselage of the tanker aircraft.

These advantages and others that will be evident to those skilled in the art are provided in the in-flight refueling system, bladder device, and method of the present invention.

BRIEF DESCRIPTION OF THE DRAWINGS

Figure 1:
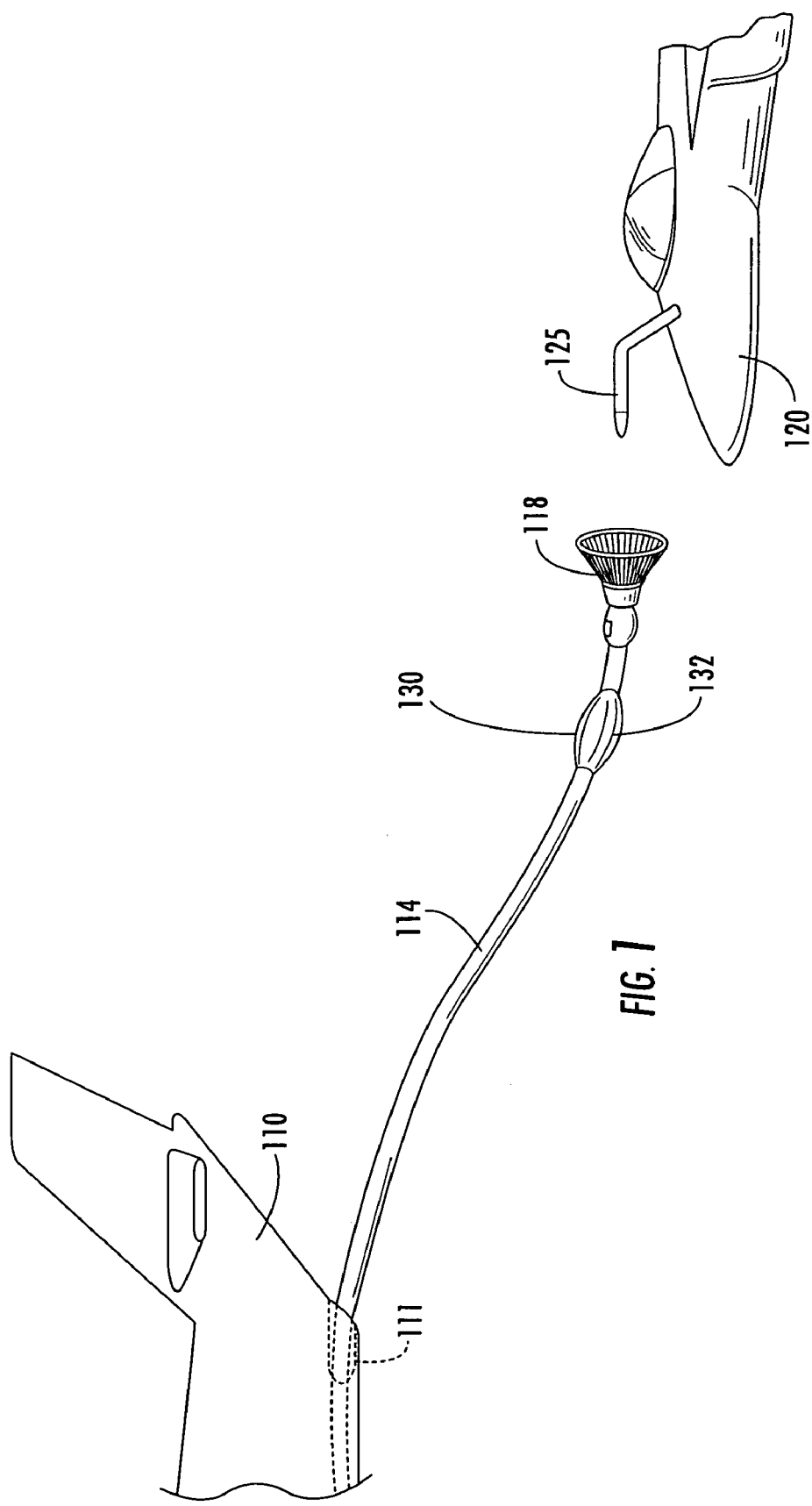
Figure 2:
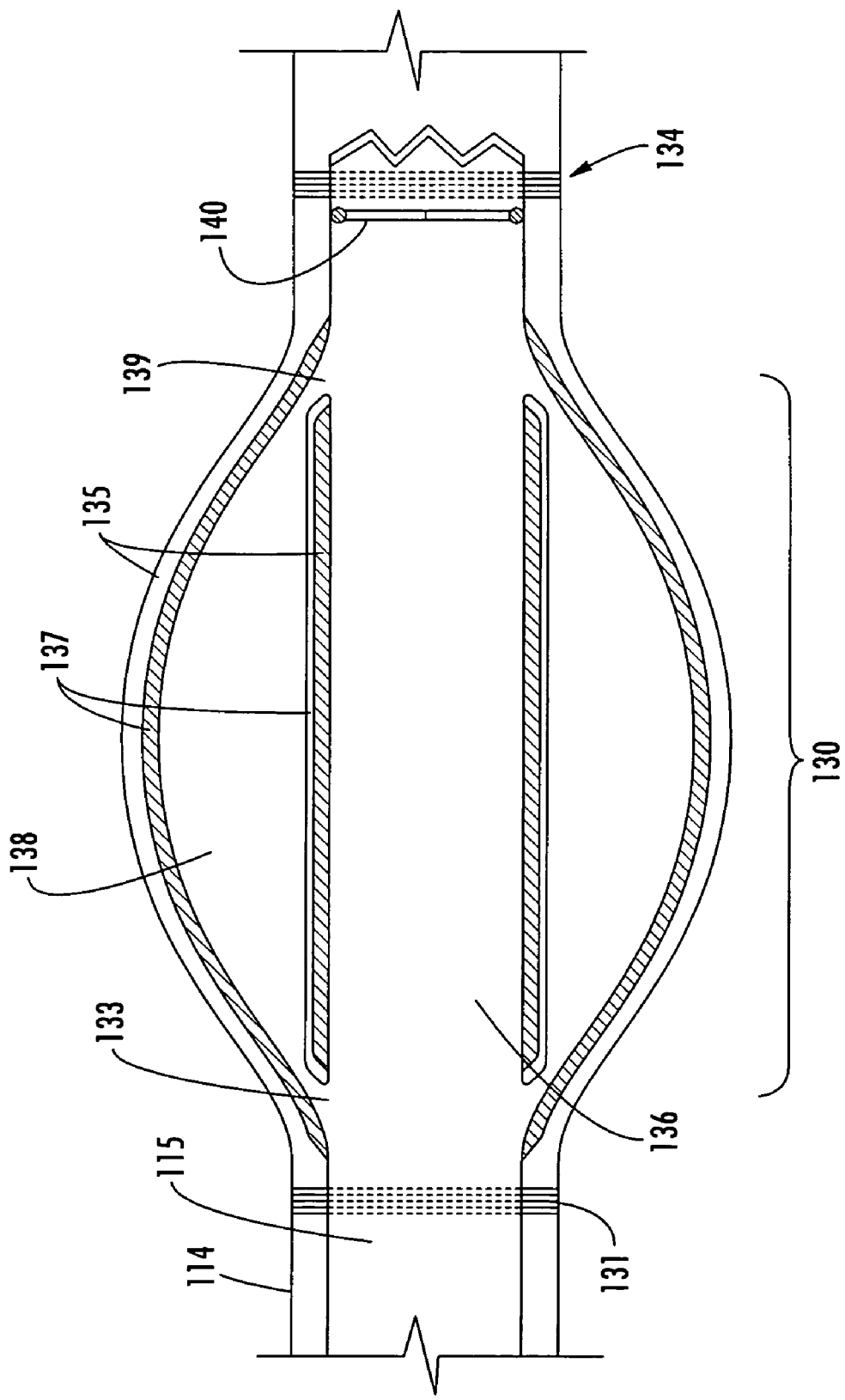

Having thus described the invention in general terms, reference will now be made to the accompanying drawings, which are not necessarily drawn to scale, and wherein:

FIG. 1 shows a side view of a tanker aircraft and an elongate hose and attached drogue extending therefrom and including a bladder device according to one embodiment of the present invention;

FIG. 2 shows a side view section of a bladder device according to one embodiment of the present invention;

FIG. 3A shows a side view of the bladder device according to one embodiment of the present invention wherein the bladder device is filled with fuel;

FIG. 3B shows a front view of the bladder device according to one embodiment of the present invention wherein the bladder device is empty and folded about the elongate hose along the pleats;

FIG. 3C shows a front view of the bladder device according to one embodiment of the present invention wherein the bladder device is partially filled with fuel; and FIG. 3D shows a front view of the bladder device according to one embodiment of the present invention wherein the bladder device is fully filled with fuel.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While the in-flight refueling system, bladder device, and method embodiments of the present invention are described below in the context of in-flight refueling operations, involving a tanker aircraft 110 extending an elongate hose 114 and drogue 118 having a bladder device 130 attached thereto wherein the bladder device 130 is configured to be filled with fuel from the elongate hose 114, it should be understood that the embodiments of the present invention may also include a bladder device 130 configured to be filled with other types of fluid that may be carried, for instance, by the tanker aircraft 110 and pumped through a conduit defined in the elongate hose 114 to the bladder device 130 so as to add weight to the portion of the elongate hose 114 to which the bladder device 130 may be operably engaged. Such fluids may include, but are not limited to, water, anti-freeze fluid, oil, or other fluids suitable for filling the bladder device 130 so as to add weight to the portion of the elongate hose 114 with which the bladder device 130 may be operably engaged such that portion the elongate hose 114 may better resist changes in disposition of the elongate hose 114 in response to an aerodynamic or other force exerted thereon.

FIG. 1 shows an in-flight refueling system according to one embodiment of the present invention including a tanker aircraft 110 and an elongate hose 114 extending therefrom. The elongate hose 114 comprises a first end (not shown) that is carried by the tanker aircraft 110 and may be operably engaged with a fuel reservoir located within a fuselage, wing structure, or other internal compartment within the tanker aircraft 110. In some embodiments, the first end of the elongate hose 114 may further be operably engaged with a refueling pod (not shown) that may be configured to be carried by a hardpoint located, for instance, on an outboard portion of a wing of the tanker aircraft 110. Furthermore, the elongate hose 114 may be configured to be capable of being taken up from an extended position and rolled up on, for instance, a rotating drum assembly that may be disposed within a fuselage of the tanker aircraft 110 or within a refueling pod carried on a wing hardpoint of the tanker aircraft 110. Also shown in FIG. 1 is the second end of the elongate hose 114 extending aft and below the tanker aircraft 110 and operably engaged with a drogue 118. The elongate hose 114 and drogue 118 attached thereto are thus positioned so as to be capable of being engaged by, for instance, a refueling probe 125, carried by a second aircraft 120 which may approach the tanker aircraft 110 from the aft and below as part of an in-flight refueling operation.

FIG. 1 also shows a bladder device 130 according to one embodiment of the present invention, operably engaged with the elongate hose 114. In the depicted embodiment, the bladder device 130 is shown surrounding the second end of the elongate hose 114 near the drogue 118. In such embodiments, the bladder device 130 may be configured to be capable of filling with fuel (or other selected fluids) from the tanker aircraft 110 so as to add stabilizing weight to the drogue 118 end of the elongate hose 114. Thus, the elongate hose 114 may more effectively resist oscillations and/or changes in disposition when subjected to external forces such as, for instance, aerodynamic and/or wind forces. The bladder device 130 may, however, in some embodiments, be capable of operably engaging the elongate hose 114 in other dispositions such as, for instance, attached above, below, or on one or more sides of the elongate hose 114. In addition, the bladder device 130 may be disposed at one or more positions along the length of the elongate hose 114 so as to add stabilizing weight to such positions when the bladder device is allowed to fill with fuel from the tanker aircraft 110 (as described more fully below).

The bladder device 130 is further configured to present a relatively compact cross section (see generally FIG. 3A) with respect to the elongate hose 114 so as to allow the bladder device 130 to be taken up into a tunnel 111 defined, for instance, in the fuselage of the tanker aircraft 110 or in a refueling pod carried thereby. In conventional probe and drogue in-flight refueling systems, the drogue 118 is configured to be capable of being withdrawn within the tunnel 111 as the elongate hose 114 is taken up (onto a drum assembly, for instance) into the fuselage of the tanker aircraft 110 or into a refueling pod carried thereby. Thus, according to embodiments of the present invention, the bladder device 130 is configured to be substantially deflated and capable of folding about itself around the elongate hose 114. Furthermore, according to other embodiments, the bladder device 130 defines a plurality of longitudinal pleats 132 such that the bladder device may be further configured to be capable of folding along the plurality of longitudinal pleats 132 about the outer surface of the elongate hose 114 such that the bladder device 130 may substantially conform to the outer surface of the elongate hose 114 when not filled (as described in more detail below). The bladder device 130 may also be configured to have a small cross section when not filled with fluid (such as, for instance, a cross-section not substantially larger than the cross section of the elongate hose 114 (as shown, for instance, in FIG. 3B)) and to have a relatively light weight so as to be capable of being drawn into the tunnel 111 defined in existing tanker aircraft 110 and/or refueling pods designed to be carried thereby. Thus, the bladder device 130 may be stowed with the drogue 118 in the tunnel 111 when not filled and in use as part of an in-flight refueling operation. In addition, the cross-section and shape of the bladder device 130 (when both filled and empty) may be configured to produce a reduced amount of drag or other aerodynamic disturbance near the drogue 118 when the elongate hose 114 is extended (as shown generally in FIGS. 1 and 2).

FIG. 2 shows a detailed side view of the bladder device 130 (in partial cross-section) according to one embodiment of the present invention wherein the bladder device 130 is operably engaged with the second end of the elongate hose 114. As shown in FIG. 2, the bladder device 130 may be inserted adjacent to the drogue 118 and connected thereto via a pair of threaded connections 131, 134. For instance, the bladder device 130 may be connected to the second end of the elongate hose 114 at a first threaded connection 131 and connected to an extended portion of the elongate hose 114 at a second threaded connection 134. In addition, the bladder device 130 may comprise a reservoir 138 which may be in fluid communication with a fuel conduit 115 defined by the elongate hose 114 (and an adjacent fuel conduit 136 defined in the bladder device 130), via a plurality of forward apertures 133 and aft apertures 139 defined in the bladder device 130. The apertures 133, 139 may be circumferentially spaced about the bladder device 130 and defined in the walls of the fuel conduit 136 so as to provide a plurality of pathways for a flow of fluid (such as fuel) from the conduits 115, 136 to the reservoir 138 of the bladder device 130. In alternate embodiments, the bladder device 130 may be integrated into the structure of the elongate hose 114 thereby eliminating the need for the threaded connections 131, 134. One skilled in the art will appreciate, however, that in some instances, it may be preferable to have the ability to selectively remove the bladder device 130 from the in-flight refueling system for repair, replacement, or to remove the bladder device 130 for certain in-flight refueling missions. In such cases, the threaded connections 131, 134 may allow for the selective removal of the bladder device 130 from the in-flight refueling system. In some embodiments, the bladder device 130 may be connected to the elongate hose 114 (so as to be in fluid communication therewith, as described above) via a number of different connection types including, but not limited to: press-fit connections, bolted connections between flanged components, rivets, and/or other connection types suitable for selectively connecting the bladder device 130 between, and in fluid communication with, both the elongate hose 114 and the drogue 118.

In other embodiments, the apertures 133, 139 may further comprise valves or other mechanisms configured to prevent the flow of fluid (such as fuel) from the fuel conduit 115 to the reservoir 138 of the bladder device 130 so as to enable an operator of the in-flight refueling system to selectively prevent the inflation of the bladder device 130 with fluid (such as fuel) as a flow of fuel is directed through the fuel conduit 115 defined in the elongate hose 114. The valves may be electromechanical or electrically-controlled such that the apertures 133, 139 may be selectively closed by, for instance, an operator of the in-flight refueling system, wherein the operator may be located within a fuselage of the tanker aircraft 110 (either in the aft section of the fuselage or in a remote aerial refueling operator (RARO) station located in a forward portion of the fuselage of the tanker aircraft 110).

According to some embodiments as shown in FIG. 2, the bladder device 130 may comprise a valve device 140 disposed, for instance at an aft end of the bladder device 130 configured to be capable of selectively closing the second end of the elongate hose 114 such that the bladder device 130 may be filled by the flow of fuel that may pass, for instance, through the apertures 133, 139 and into the reservoir 138 of the bladder device 130 instead of through the second end of the elongate hose 114, the drogue 118, and on to a second aircraft 120 (via, for instance, a refueling probe 125 carried by the second aircraft 120). The valve device 140 may comprise various types of electromechanical valve devices having various opening and closing mechanisms including, but not limited to, iris valves, hinged opening valves, screw valves, stopcock valves, and/or other valve types suitable for being remotely operated (by, for instance, an operator of the in-flight refueling device) to selectively prevent the flow of fuel through the second end of the elongate hose 114 such that fuel may pass instead through the apertures 133, 139 and into the reservoir 138 of the bladder device 130. One skilled in the art will appreciate that existing probe and drogue in-flight refueling systems may also comprise fuel shut-off valves disposed, for instance, within the drogue 118 and that such fuel shut-off valves may also be actuated to be closed so as to expedite the passage of fuel from the conduits 115, 136 to the reservoir 138 of the bladder device 130 so as to add additional weight to the second end of the elongate hose 114 so as to resist a change in disposition of the second end of the elongate hose 114 in response to an aerodynamic force (such as wind, wind shears, jet wash, or other disturbances that may be encountered when the elongate hose 114 is extended from the tanker aircraft 110 during the course of an in-flight refueling operation). The added weight of the filled bladder device 130 may also aid in stabilizing the position of the elongate hose 114 (and the drogue 118 attached thereto) by creating additional inertia in the elongate hose 114 such that the aerodynamic disturbances produced in the area ahead of a second aircraft 120 (known in some instances as a "bow wave") may be less likely to push the elongate hose 114 and drogue 118 forward or laterally as the second aircraft 120 approaches the tanker aircraft 110 as part of an in-flight refueling operation.

In addition, once the bladder device 130 has been filled with the flow of fuel (by the closing of either an integrated valve device 140 and/or a fuel shut-off valve disposed downstream of the bladder device 130) the valve device 140 (and/or fuel shut-off valve) may be opened so that fuel may flow through the conduits 115, 136, into the drogue 118, and further into the refueling probe 125 engaged with the drogue 118 during an in-flight refueling operation. According to the embodiments of the present invention, the bladder device 130 may remain filled with the flow of fuel provided via the conduit 115 of the elongate hose 114 (or an alternate conduit if other fluids are used to fill the bladder device 130) even as fuel is allowed to pass through the open valve device 140 and into the fuel tanks of an engaged second aircraft 120. Furthermore, at the conclusion of an in-flight refueling operation, the integrated valve device 140 and/or a fuel shut-off valve disposed downstream of the bladder device 130 may be opened as the elongate hose 114 is taken up (on to, for instance, a roller drum disposed within a fuselage of the tanker aircraft 110) such that any fuel remaining in the conduit 115 of the elongate hose 114 or the reservoir 138 of the bladder device 130 may be expelled out of the second end (nearest the drogue 118) of the elongate hose 114. One skilled in the art will appreciate that as the elongate hose 114 is taken up the elongate hose 114 (and the conduit 115 defined therein) may be flattened such that residual fuel in the elongate hose 114 may be forced out the open second end of the elongate hose 114 during the take-up or retraction process.

Also, as shown in FIG. 2, the bladder device 130 may include a dual-layer construction so as to be capable of containing the fluid within the reservoir 138 and/or the conduit 136 as well as providing a durable outer layer suitable for protecting the bladder device 130 from damage due to external forces such as aerodynamic forces, impacts with other objects (such as the refueling probe 125 carried by a second aircraft 120) or other external forces that may be encountered by the bladder device during the course of its intended uses. For instance, the bladder device 130 may include an inner liner 137 configured to contain fluids (such as, for instance, a flow of fuel) and an outer sheath 135 configured to be capable of containing the inner liner 137. In some embodiments, the inner liner may be composed of an elastic material such as rubber, polymer, or another flexible and substantially fluid-tight sealing material suitable for containing fuel or other fluids used to fill the bladder device 130. Furthermore, in some embodiments, the outer sheath 135 may be composed of a substantially non-elastic material such that the filled bladder device 130 is constrained to a pre-determined shape. For example, the outer sheath 135 of the bladder device 130 may comprise woven metallic materials; woven alloys, or any other material that is suitable for constraining the filled bladder device 130 to a predetermined shape (and for reinforcing the bladder device so as to prevent the rupture of the bladder device as it is filled by the flow of fluid (such as fuel) from the tanker aircraft 110.) The outer sheath 135 may be further configured to protect the bladder device 130 from puncture due to impacts with the second aircraft 120 as it approaches and engages the elongate hose 114 and drogue 118 during the course of in-flight refueling operations.

In some embodiments such as that shown in FIG. 2, the outer sheath 135 may be configured to constrain the bladder device 130 to a tapered "egg" shape about the elongate hose 114 when filled with fuel or other fluids such that the filled bladder device 130 may be configured to produce a minimum amount of drag and/or other aerodynamic disturbances as it is trailed aft and below the tanker aircraft 110 as part of a probe and drogue in-flight refueling operation. According to other embodiments, the filled bladder device 130 may be configured to be constrained to a "bullet" shape or another aerodynamically advantageous shape such that the elongate hose 114 with which it may be operably engaged may produce a minimum amount of drag when filled with fluid and in use as part of an in-flight refueling operation. In some other embodiments, the filled bladder device 130 may also be configured to be shaped in a manner configured to produce an increase in drag force so as to stabilize the portion of the elongate hose 114 to which it is attached. For instance, one skilled in the art will appreciate that the bladder device 130 may alternatively be configured to attain a filled shape that produces a drag force on the elongate hose 114 as it is trailed aft and below the tanker aircraft 110 during an in-flight refueling operation. In such embodiments, the drag force produced by the filled bladder device 130 may, in conjunction with the weight added by the fluid-filled reservoir 138 of the bladder device 130, act to dampen or resist a change in disposition in the elongate hose 114 as the elongate hose 114 is trailed aft and below the tanker aircraft 110.

FIGS. 3A–3D show the bladder device 130 according to one embodiment of the present invention in various stages of inflation with fluid (such as fuel from the tanker aircraft 110). FIG.3A is a side view of an at least partially filled bladder device 130 having a plurality of longitudinal pleats 132 that may be defined in the outer sheath 135 of the bladder device 130. The pleats 132 may allow the bladder device 130 to fold about itself along the longitudinal pleats 132 defined in the bladder device 130. For instance, FIG. 3B shows a front view of a bladder device 130 according to one embodiment of the present invention wherein the bladder device 130 is substantially empty and folded along the pleats 132 defined in the bladder device 130 such that the empty cross-section of the bladder device 130 may be reduced with respect to the cross-section of the elongate hose 114 with which it may be operably engaged (see FIG. 3A). Furthermore, FIG. 3C shows a front view of the bladder device 130 when it is partially filled with fluid (such as fuel) and shows the partial expansion of the bladder device 130 along the pleats 132 defined therein. Finally, FIG. 3D shows a front view of a fully-filled bladder device 130 corresponding to the side view of the bladder device 130 shown in FIG. 3A. As described above, the outer sheath 135 (and the materials incorporated therein) may constrain the filled shape of the bladder device 130 such that it may have an aerodynamically advantageous and/or drag reducing "egg" shape so as to allow the added weight of the fuel in the bladder device 130 to resist a change in the disposition of the elongate hose 114 while creating a minimum of drag and/or other aerodynamic disturbances in the area aft and below the tanker aircraft 110.

Referring again to FIGS. 1 and 2, a method for facilitating the stabilization of an elongate hose 114 having a first end carried by a tanker aircraft 110 and an opposing second end (operably engaged with a drogue 118) configured to extend from the tanker aircraft 110 is described. According to some embodiments, the method may comprise the step of filling a bladder device 130 (wherein the bladder device 130 is operably engaged with a portion of the elongate hose 114) with fluid (such as, for instance, fuel) such that the weight of the portion of the elongate hose 114 is increased so as to resist a change in disposition of the portion of the elongate hose 114 in response to an aerodynamic force exerted on the elongate hose 114. The filling step described above may further comprise filling the bladder device 130 with a flow of fuel carried by the elongate hose 114 (or a conduit 115, defined therein) such that the weight of the portion of the elongate hose 114 is increased so as to resist a change in disposition of the portion of the elongate hose 114 in response to an aerodynamic force exerted on the elongate hose 114.

According to some other embodiments, the method of the present invention may further comprise the step of closing the second end of the elongate hose 114 (using, for instance, a valve device 140 or a fuel shut-off valve disposed in the drogue 118) such that the bladder device 130 may be filled by a flow of fuel pumped from the tanker aircraft 110. In other embodiments, the method of the present invention may further comprise the step of opening the second end of the elongate hose 114 after the bladder device 130 has been filled by the flow of fuel so as to allow the flow of fuel to pass through the elongate hose 114, through the drogue 118, and into the refueling probe 125 carried by a second aircraft 120 that may be engaged with the drogue 118 during a probe and drogue in-flight refueling operation. Finally, according to some embodiments the method of the present invention may also comprise the steps of retracting the elongate hose 114 relative to the tanker aircraft 110 (by, for instance, taking up the elongate hose 114 onto a drum roller or other retraction mechanism located within a fuselage of the tanker aircraft 110 or within a refueling pod carried thereby), and compressing the elongate hose as the elongate hose 114 is retracted such that fluid is expelled from the bladder device 130 as the elongate hose 114 is retracted. For instance, one skilled in the art will appreciate that in some existing hose and drogue refueling systems, the elongate hose 114 is flattened as it is taken up onto a drum roller located in the fuselage of the tanker aircraft 110 (or onto a drum located within a refueling pod carried by the tanker aircraft 110. Thus, as the elongate hose 114 is retracted, the conduit 115 defined therein may be flattened as well such that any fuel remaining therein may be forced out the second end of the elongate hose 114 and out of the bladder device 130 operably engaged therewith as described above (so long as the valve device 140 and/or fuel shut-off valves are opened as the elongate hose 114 is retracted). Thus, any remaining fuel may be forced out through the drogue 118 and expelled into the air aft and below of the tanker aircraft 110. One skilled in the art will appreciate that the retraction step should occur only after the in-flight refueling operation has ceased and after the second aircraft 120 has disengaged from the drogue 118 and cleared from the in-flight refueling position aft and below the tanker aircraft 110.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limitation.

What is claimed is:

1. An in-flight refueling system comprising:
   a tanker aircraft;
   an elongate hose having a first end carried by the tanker aircraft and an opposing second end configured to extend from the tanker aircraft, the elongate hose defining a fuel conduit configured to carry a flow of fuel from the tanker aircraft to the second end thereof; and
   a bladder device operably engaged with a portion of the elongate hose and capable of being filled by a fluid so as to substantially increase the weight of the portion of the elongate hose, thereby resisting a change in disposition of the portion of the elongate hose in response to an aerodynamic force exerted thereon.

2. An in-flight refueling system according to claim 1, wherein the portion of the elongate hose is the second end of the elongate hose.

3. An in-flight refueling system according to claim 1, wherein the bladder device is configured to substantially surround the elongate hose.

4. An in-flight refueling system according to claim 1, wherein the bladder device defines a plurality of longitudinal pleats such that the bladder device is further configured to be capable of folding along the plurality of longitudinal pleats about an outer surface of the elongate hose such that the bladder device substantially conforms to the outer surface of the elongate hose when not filled by the fluid.

5. An in-flight refueling system according to claim 1, wherein the bladder device is configured to be in fluid communication with the fuel conduit so as to be capable of being filled by the flow of fuel carried thereby.

6. An in-flight refueling system according to claim 5, wherein the bladder device comprises:
   an inner liner configured to contain the flow of fuel; and
   an outer sheath configured to be capable of containing the inner liner, the outer sheath being composed of a substantially non-elastic material such that the filled bladder device is constrained to a pre-determined shape.

7. An in-flight refueling system according to claim 5, further comprising a valve device configured to be capable of selectively closing the second end of the elongate hose so that the bladder device may be filled by the flow of fuel.

8. An in-flight refueling system adapted to be carried by a tanker aircraft, comprising:
   an elongate hose having a first end carried by the tanker aircraft and an opposing second end configured to extend from the tanker aircraft, the elongate hose defining a fuel conduit configured to carry a flow of fuel from the tanker aircraft to the second end thereof; and
   a bladder device operably engaged with a portion of the elongate hose and capable of being filled by a fluid so as to substantially increase the weight of the portion of the elongate hose, thereby resisting a change in disposition of the portion of the elongate hose in response to an aerodynamic force exerted thereon.

9. An in-flight refueling system according to claim 8, wherein the portion of the elongate hose is the second end of the elongate hose.

10. An in-flight refueling system according to claim 8, wherein the bladder device is configured to substantially surround the elongate hose.

11. An in-flight refueling system according to claim 8, wherein the bladder device defines a plurality of longitudinal pleats such that the bladder device is further configured to be capable of folding along the plurality of longitudinal pleats about an outer surface of the elongate hose such that the bladder device substantially conforms to the outer surface of the elongate hose when not filled by the flow of fuel.

12. An in-flight refueling system according to claim 8, wherein the bladder device is configured to be in fluid communication with the fuel conduit so as to be capable of being filled by the flow of fuel carried thereby.

13. An in-flight refueling system according to claim 12, wherein the bladder device comprises:
   an inner liner configured to contain the flow of fuel; and
   an outer sheath configured to be capable of containing the inner liner, the outer sheath being composed of a substantially non-elastic material such that the filled bladder device is constrained to a pre-determined shape.

14. An in-flight refueling system according to claim 12, further comprising a valve device configured to be capable of selectively closing the second end of the elongate hose so that the bladder device may be filled by the flow of fuel.

15. A bladder device adapted to be operably engaged with a portion of an elongate hose, the elongate hose having a first end carried by a tanker aircraft and an opposing second end configured to extend from the tanker aircraft, the elongate hose being configured to carry a flow of fuel from the tanker aircraft to the second end thereof, the bladder device being configured to be in fluid communication with the elongate hose so as to be capable of being filled by the flow of fuel carried thereby, the filled bladder device thereby being configured to substantially increase the weight of the portion of the elongate hose so as to resist a change in disposition of the portion of the elongate hose in response to an aerodynamic force exerted thereon.

16. A bladder device according to claim 15, the bladder device being further configured to substantially surround the elongate hose.

17. A bladder device according to claim 15, comprising:
   an inner liner configured to contain the flow of fuel; and
   an outer sheath configured to be capable of containing the inner liner, the outer sheath being composed of a substantially non-elastic material such that the filled bladder device is constrained to a pre-determined shape.

18. A bladder device according to claim 15, the bladder device defining longitudinal pleats such that the bladder device is further configured to be capable of folding along the longitudinal pleats about an outer surface of the elongate hose such that the bladder device substantially conforms to the outer surface of the elongate hose when not filled by the flow of fuel.

* * * * *